May 21, 1929.  W. J. KADLEC  1,713,905
GATE VALVE
Filed May 5, 1928   2 Sheets-Sheet 2
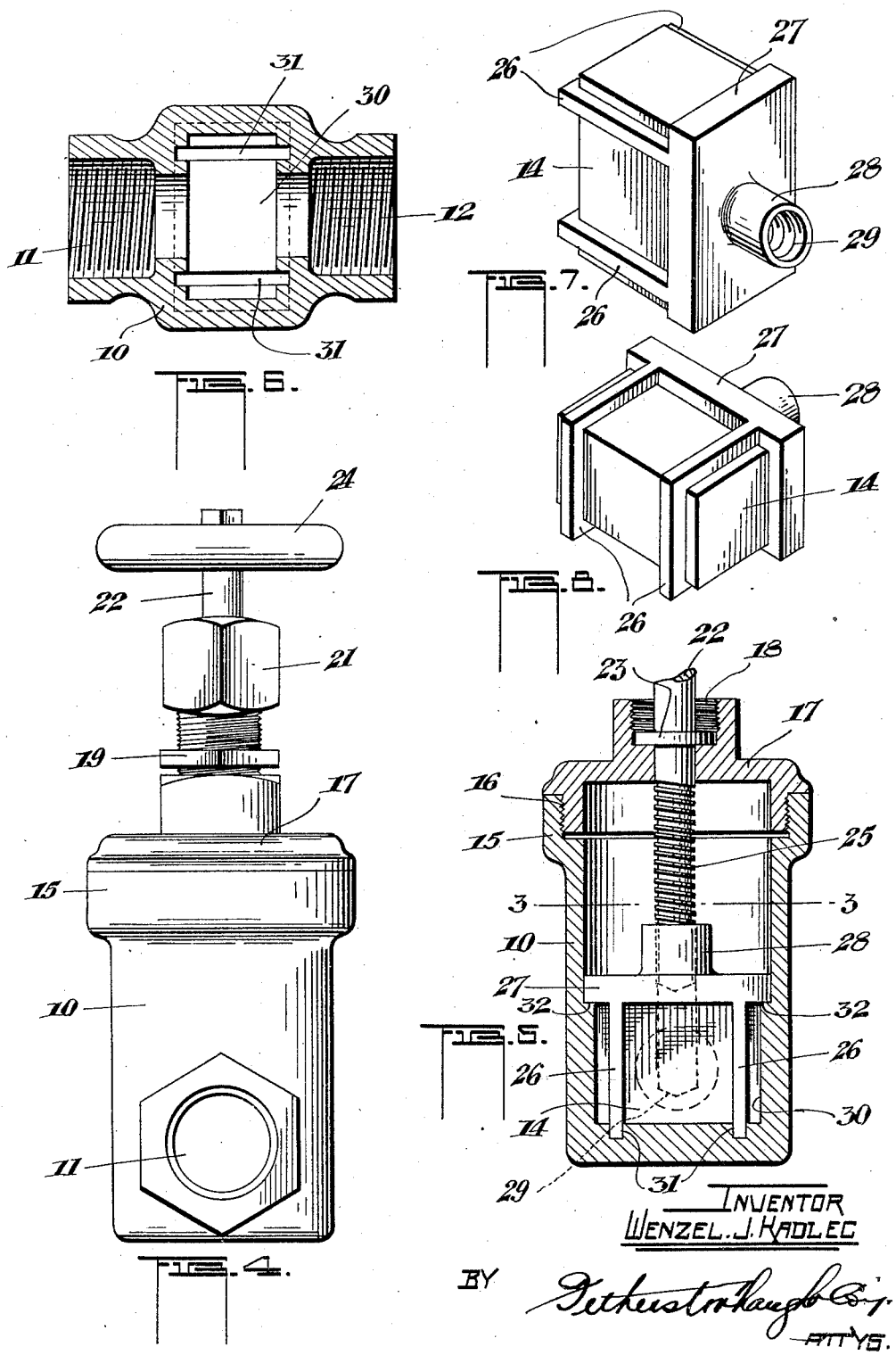

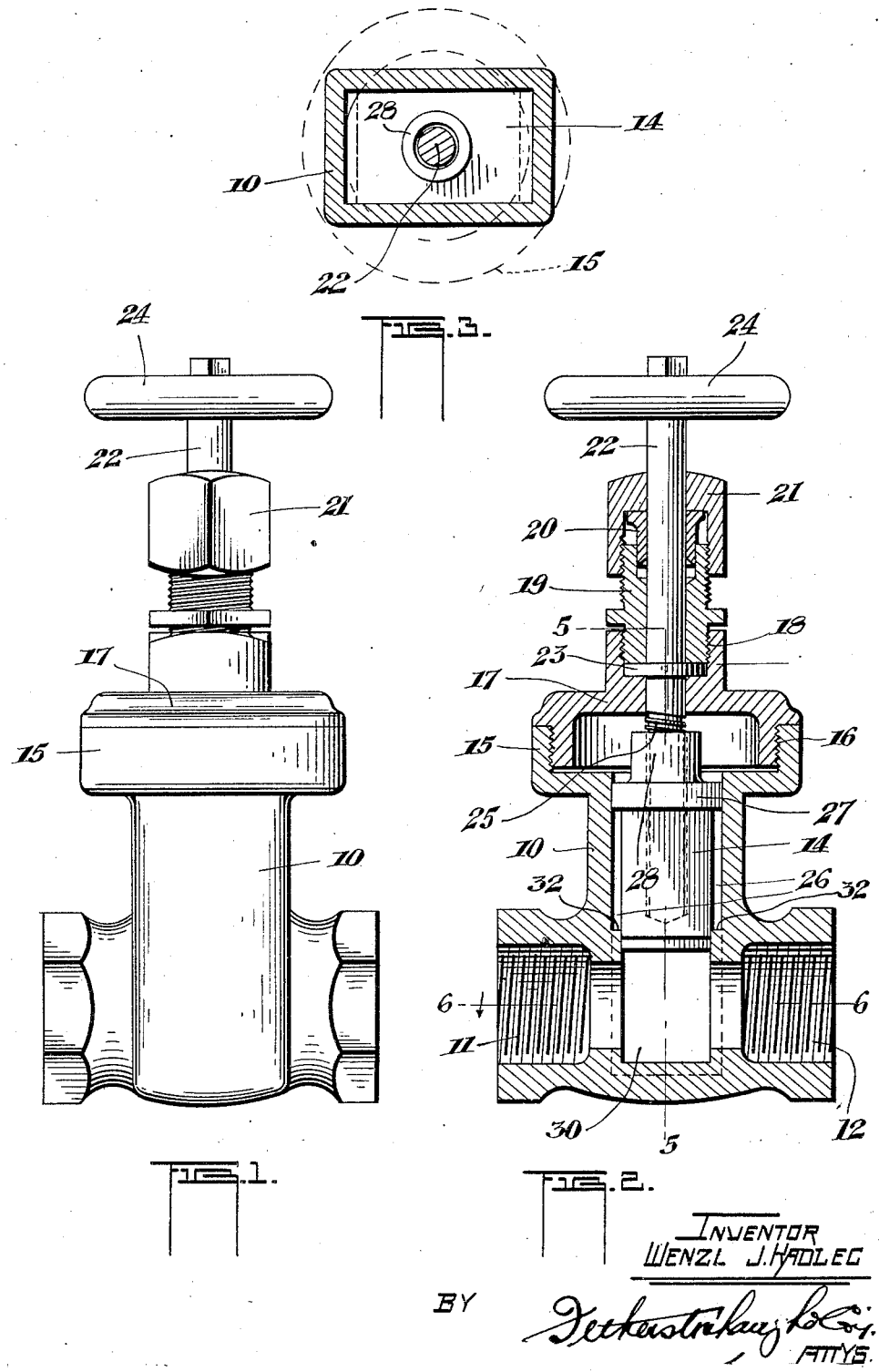

Patented May 21, 1929.

1,713,905

UNITED STATES PATENT OFFICE.

WENZL JOSEPH KADLEC, OF WETASKIWIN, ALBERTA, CANADA.

GATE VALVE.

Application filed May 5, 1928, Serial No. 275,514, and in Canada June 21, 1927.

This invention relates to improvements in gate valves, particularly of the type associated with steam, and an object of the invention is to provide a valve of this character, which will more effectively perform the functions required of it.

A further object is to provide a valve of this type with few wearing parts, and thereby reduce the necessity of frequent replacements.

Yet a further object is to so improve the valve that the fittings therein will operate in a closer margin, and thereby reduce loss of leakage to a minimum.

With the foregoing and other objects in view, the invention consists essentially of a valve body, provided with inlet and outlet ports, and a substantially rectangular valve member slidably operable between the ports, and provided with engaging ribs, and adapted when in operation to engage slots formed in the body of the valve.

In the accompanying drawing, in which my improved valve is illustrated,

Figure 1 is a side elevation of my improved gate valve.

Figure 2 is a sectional elevation showing the valve member in open position.

Figure 3 is a section taken on the line 3—3 of Figure 5, showing the valve in closed position.

Figure 4 is end elevation of the assembled valve.

Figure 5 is a section taken on the line 5—5 of Figure 2.

Figure 6 is a section taken on the line 6—6 of Figure 2.

Figures 7 and 8 are perspective views of the valve member as seen in different positions.

Referring now to the accompanying drawing, in which my improved device is disclosed, and in which like characters of reference indicate corresponding parts, 10 refers to the body of the valve, while 11 and 12 indicate the inlet and outlet ports respectively.

The body of the valve is designed to operatively house the valve member 14, which will be hereinafter more fully referred to.

The upper portion of the valve body (see Figures 1 and 2) is provided with an enlarged portion 15 internally threaded as indicated at 16, and adapted to receive therein, the fitting 17. This fitting as indicated at 18 is also threaded and is adapted to receive therein the adjusting nut 19, and with which is associated the packing and cap members 20 and 21 of standard calibre.

Within the valve and operatively supported by the fittings just described, is the valve stem 22 provided with a collar 23 and operating handle 24. The lower extremity of the valve stem is designed to operatively engage the valve member 14, and for this purpose is threaded as indicated at 25.

Reverting to the valve member 14, which is an essential feature of the invention, this comprises a metal block of substantially rectangular formation.

The lower and side faces of the block are as particularly illustrated in Figures 7 and 8, provided with integrally formed outwardly extending ribs 26, while the top of the valve is provided with a protruding flange 27.

A shoulder or boss 28 is also formed integral with the valve, and is provided with a threaded bore 29, which extends into the body of the block (see dotted lines Figure 5), and which is adapted in operation to be engaged by the threaded portion 25 of the valve stem 23.

The interior of the body of the valve indicated by the character 30, and commonly known as the valve seat, is designed to slidably retain the valve 14 therein, and to ensure a leak-proof fit of the valve in operation, the body is provided with substantially U-shaped recesses 31, to accommodate the ribs 26, the top of which in turn is formed by the shoulder 32 which the projecting flange 26 butts, when the valve is in closed position.

From the foregoing it will be seen that the valve is simple and effective in construction and operation, will eliminate leakage and at the same time reduce wear and tear to a minimum.

As many changes could be made in the above construction, and many apparently widely different embodiments of my invention, within the scope of the claims, constructed without departing from the spirit or scope thereof, it is intended that all matter contained in the accompanying specification and drawing shall be interpreted as illustrative and not in a limiting sense.

What I claim as my invention is:

1. A gate valve of rectangular shape with a projecting cap thereon and with ribs extending around the remaining sides, a little distance from either end, and extending from one side of the cap to the other and flush with it, with channels in the seat and side walls, at inlet and outlet, into which the side ribs closely fit and formed with a projection to snugly engage with the cap.

2. A valve of the character described, comprising a body portion, a valve seat within the body, a valve stem, inlet and outlet ports communicating with the said seat, a slidably operable valve member within the body, provided with a plurality of outwardly extending ribs, protruding flanges and a boss, a threaded bore in the valve member adapted to be engaged by the valve stem, a plurality of recesses and shoulders formed in the valve seat adapted to be engaged by the ribs and flanges of the valve member, and an operating handle for the valve stem adapted to control the operative movement of the valve member.

In witness whereof I have hereunto set my hand.

WENZL JOSEPH KADLEC.